(12) United States Patent
Tsutsui et al.

(10) Patent No.: US 11,231,208 B2
(45) Date of Patent: Jan. 25, 2022

(54) SOLAR HEAT COLLECTOR TUBE (71) Applicants: KABUSHIKI KAISHA TOYOTA JIDOSHOKKI, Kariya (JP); JAPAN FINE CERAMICS CENTER, Nagoya (JP)

(72) Inventors: Takuhito Tsutsui, Kariya (JP); Toru Sasatani, Kariya (JP); Kazuto Noritake, Kariya (JP); Yoshiki Okuhara, Nagoya (JP); Tomohiro Kuroyama, Nagoya (JP); Daisuke Igimi, Nagoya (JP)

(73) Assignees: KABUSHIKI KAISHA TOYOTA JIDOSHOKKI, Kariya (JP); JAPAN FINE CERAMICS CENTER, Nagoya (JP)

( * ) Notice: Subject to any disclaimer, the term of this patent is extended or adjusted under 35 U.S.C. 154(b) by 223 days.

(21) Appl. No.: 16/073,398

(22) PCT Filed: Nov. 18, 2016

(86) PCT No.: PCT/JP2016/084341
§ 371 (c)(1),
(2) Date: Jul. 27, 2018

(87) PCT Pub. No.: WO2017/130535
PCT Pub. Date: Aug. 3, 2017

(65) Prior Publication Data
US 2019/0041098 A1 Feb. 7, 2019

(30) Foreign Application Priority Data
Jan. 29, 2016 (JP) .............................. JP2016-015492

(51) Int. Cl.
*F24S 70/30* (2018.01)
*F24S 10/70* (2018.01)
(Continued)

(52) U.S. Cl.
CPC ............... *F24S 70/30* (2018.05); *F24S 10/70* (2018.05); *F24S 70/10* (2018.05); *F24S 70/16* (2018.05); *F24S 70/25* (2018.05); *Y02E 10/44* (2013.01)

(58) Field of Classification Search
USPC ......................................................... 126/676
See application file for complete search history.

(56) References Cited

U.S. PATENT DOCUMENTS 5,523,132 A * 6/1996 Zhang ................... F24S 70/225
428/34.4
2006/0141272 A1* 6/2006 Wolfe .................. G02B 5/0891
428/457
(Continued)

FOREIGN PATENT DOCUMENTS

CN 101514853 A 8/2009
CN 103105011 A 5/2013
(Continued)

OTHER PUBLICATIONS

Y. Minamide et al., "Agglomeration suppression behavior and mechanisms of Ag—Cu and Ag—Nb thin films" Vacuum, vol. 84, 2010, pp. 657-662 ( 6 pages total).
(Continued)

*Primary Examiner* — Kenneth J Hansen
*Assistant Examiner* — John E Bargero
(74) *Attorney, Agent, or Firm* — Sughrue Mion, PLLC (57) ABSTRACT

A solar heat collector tube in which at least an infrared reflective layer, a sunlight-heat conversion layer and an anti-reflection layer are provided on the outer surface of a tube through the interior of which a heat medium can flow, wherein the infrared reflective layer in the solar heat collector tube is an Ag layer having Nb dispersed therein, the content of Nb being 0.1 at % to 31.8 at %.

5 Claims, 6 Drawing Sheets (51) Int. Cl.
*F24S 70/10* (2018.01)
*F24S 70/25* (2018.01)
*F24S 70/16* (2018.01)

(56) References Cited

U.S. PATENT DOCUMENTS

| | | | |
|---|---|---|---|
| 2010/0294263 | A1 | 11/2010 | Kuckelkorn et al. |
| 2010/0313875 | A1* | 12/2010 | Kennedy .................. F24S 10/45 126/652 |
| 2011/0005575 | A1* | 1/2011 | Cao ................... H01L 31/02366 136/246 |
| 2011/0249326 | A1* | 10/2011 | Villuendas Yuste .... C23C 14/35 359/360 |
| 2014/0305123 | A1 | 10/2014 | Sato et al. |
| 2016/0003498 | A1 | 1/2016 | Kusiaku et al. |

FOREIGN PATENT DOCUMENTS

| | | |
|---|---|---|
| CN | 103443559 A | 12/2013 |
| EP | 2341038 A1 | 7/2011 |
| JP | 7315874 A | 12/1995 |
| JP | 2010-271033 A | 12/2010 |
| JP | 2012-506021 A | 3/2012 |

OTHER PUBLICATIONS

H.S. Gurev et al., "High Temperature; Stable, Spectrally Selective Solar Absorbers for Thermochemical Hydrogen Production" International Journal of Hydrogen Energy, vol. 2, 1977, pp. 259-267 ( 9 pages total).

Communication dated Jun. 5, 2019, from the European Patent Office in counterpart application No. 16888120.9.

Communication dated May 31, 2019, from the State Intellectual Property Office of the P.R.C in counterpart application No. 201680080224.5.

International Search report of PCT/JP2016/084341, filed Dec. 20, 2016.

\* cited by examiner

SOLAR HEAT COLLECTOR TUBE

This application is a National Stage of International Application No. PCT/JP2016/084341 filed Nov. 18, 2016, claiming priority based on Japanese Patent Application No. 2016-015492, filed Jan. 29, 2016.

TECHNICAL FIELD

The present invention relates to a solar heat collector tube.

BACKGROUND ART

Solar heat power generation apparatuses that convert sunlight to heat and generate power utilizing that heat are known. In these apparatuses, sunlight is condensed by condensing means, a heat medium inside a solar heat collector tube is heated by the condensed sunlight, and thermal energy of the heat medium having been thus heated is utilized to generate power. Such apparatuses utilize therefore a solar heat collector tube in which various layers for efficiently converting sunlight to heat are formed on the outer surface of a tube, through the interior of which the heat medium can flow. On the outer surface of a tube, through the interior of which a heat medium can flow, there are, for instance, formed an infrared reflective layer that reflects thermal radiation from the medium and the tube, a sunlight-heat conversion layer that converts sunlight to heat, and an anti-reflection layer that prevents reflection of sunlight. Among these various layers, using an Ag layer on the infrared reflective layer is well known (see for instance Patent Literature 1).

CITATION LIST

Patent Literature

[Patent Literature 1] Japanese Patent Application Publication No. 2010-271033

SUMMARY OF INVENTION

Technical Problem

When the temperature of the heat medium flowing through the interior of the solar heat collector tube increases, the temperature of the outer surface of the tube having the heat medium flowing therethrough become around 650° C. to 700° C., and also the infrared reflective layer formed on the outer surface of the tube becomes exposed to a high temperature. Herein Ag layers conventionally used as the infrared reflective layer do not have sufficient heat resistance, and as a result Ag suffers aggregation and sublimation, in about 1 hour, when exposed to high temperatures, and the effect of reflecting thermal radiation from the heat medium and the tube is weakened. Thus the efficiency of converting sunlight to heat decreases, since the Ag layer in such a state cannot sufficiently function as an infrared reflective layer.

In order to solve the above problem, it is an object of the present invention to provide a solar heat collector tube in which efficiency of converting sunlight to heat does not drop readily, through the use, in an infrared reflective layer, of an Ag layer having excellent heat resistance and in which aggregation and sublimation of Ag can be suppressed, even upon exposure to high temperatures.

Solution to Problem

As a result of diligent research aimed at solving the above problem, the inventors found that aggregation and sublimation of Ag can be suppressed by dispersing Nb (niobium) in the Ag layer, at a predetermined proportion, and perfected the present invention on the basis of that finding.

Specifically, the present invention is a solar heat collector tube in which at least an infrared reflective layer, a sunlight-heat conversion layer and an anti-reflection layer are provided on the outer surface of a tube through the interior of which a heat medium can flow, wherein the infrared reflective layer is an Ag layer having Nb dispersed therein, and the content of Nb is 0.1 at % to 31.8 at %.

Advantageous Effects of Invention

The present invention succeeds in providing a solar heat collector tube in which efficiency of conversion of sunlight to heat does not drop readily, through the use, in an infrared reflective layer, of an Ag layer having excellent heat resistance and in which aggregation and sublimation of Ag can be suppressed, even upon exposure to high temperatures.

DESCRIPTION OF EMBODIMENTS

Preferred embodiments of the solar heat collector tube of the present invention will be explained next with reference to accompanying drawings.

Embodiment 1

Figure 1:
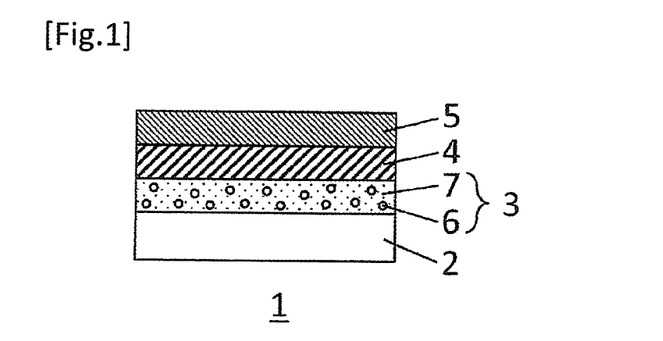
FIG. 1 is a partial cross-sectional diagram of a solar heat collector tube of Embodiment 1.

FIG. 1 is a partial cross-sectional diagram of a solar heat collector tube of the present embodiment.

In FIG. 1 a solar heat collector tube 1 of the present embodiment has a tube 2, through the interior of which a heat medium can flow, an infrared reflective layer 3 formed on the outer surface of the tube 2, a sunlight-heat conversion layer 4 formed on the infrared reflective layer 3, and an anti-reflection layer 5 formed on the sunlight-heat conversion layer 4.

The tube 2 through the interior of which a heat medium can flow is not particularly limited, and tubes known in the relevant technical field can be used herein. Ordinarily, a metal having heat resistance, as represented by an iron-based material (for instance, stainless steel, heat-resistant steel, alloy steel or carbon steel) or an aluminum-based material, can be used as the material of the tube 2. Taking the usage environment (for instance, the heating temperature of the tube 2) into account, the tube 2 is preferably made of stainless steel or heat-resistant steel.

The heat medium that flows through the interior of the tube 2 is not particularly limited, and heat media known in the relevant technical field can be used herein. Examples of the heat medium include for instance water, oil, molten salts (for instance molten sodium) and the like.

The infrared reflective layer 3 formed on the outer surface of the tube 2 has the function of reflecting thermal radiation (heat radiation) from the heat medium and the tube 2. The heat medium used in the solar heat collector tube 1 and the materials in the tube 2 and so forth may in some instances become heated to a high temperature of around 650° C. to 700° C., in which case most of the emitted electromagnetic waves are infrared rays. Accordingly, the main function of the infrared reflective layer 3 is to reflect these infrared rays. Specifically, the infrared reflective layer 3 suppresses emission, towards the exterior of the tube 2, of thermal energy given off by the heat medium and the tube 2.

Conventionally an Ag layer 7 has been used as the infrared reflective layer 3. However, an Ag layer 7 made up of only Ag exhibits aggregation or sublimation of Ag, after about 1 hour, when exposed at a high temperature of around 650° C. to 700° C.

Figure 2:
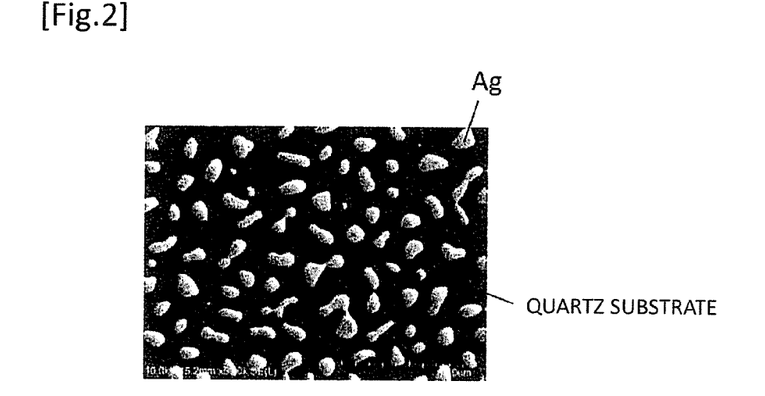
FIG. 2 is a scanning electronic microscope (SEM) micrograph of an Ag layer made of Ag alone and formed on a quartz substrate, after having been heated for 1 hour at 700° C.
Figure 3:
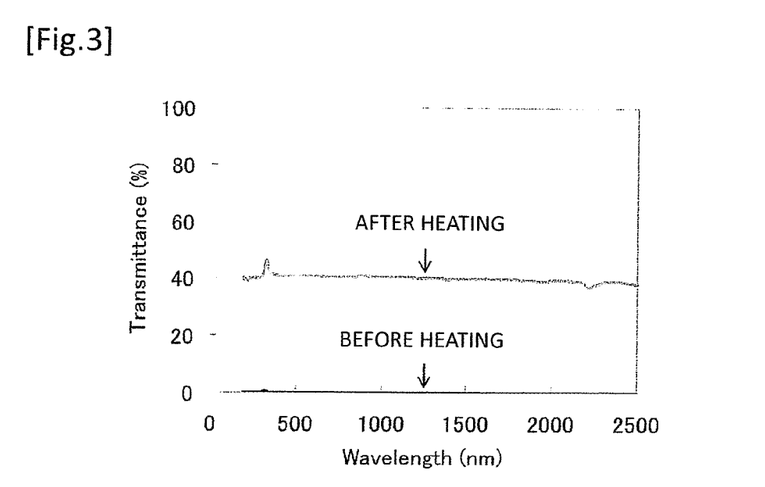
FIG. 3 illustrates results of light transmittance of an Ag layer made of Ag alone and formed on a quartz substrate, before and after 1 hour of heating at 700° C.

FIG. 2 illustrates a scanning electronic microscope (SEM) micrograph of an Ag layer 7 made of Ag alone and formed on a quartz substrate, after having been heated for 1 hour at 700° C. FIG. 3 illustrates results of light transmittance of the Ag layer 7 before and after heating.

As depicted in FIG. 2, Ag in the Ag layer 7 sublimates and aggregates due to heating, and the quartz substrate that is an underlying lower of Ag layer 7 becomes exposed. As illustrated in FIG. 3, the Ag layer 7 before heating has substantially zero light transmittance at a wavelength region from about 200 nm to 2500 nm (no light is transmitted within this wavelength region), whereas the Ag layer 7 after heating exhibits a light transmittance of about 40% in the wavelength region from about 200 nm to 2500 nm (light is transmitted in this wavelength region). The function as the infrared reflective layer 3 (function of reflecting thermal radiation from the heat medium and the tube) is thus not sufficiently brought out by the Ag layer 7 having suffered aggregation and sublimation of Ag, and accordingly the effect in conversion of sunlight to heat is low.

Therefore, an Ag layer 7 having Nb 6 dispersed therein is used as the infrared reflective layer 3 in the solar heat collector tube 1 of the present embodiment. Herein Nb 6 has the function of suppressing aggregation and sublimation of Ag in the Ag layer 7, as a result of which there is enhanced the heat resistance of the Ag layer 7.

Figure 4:
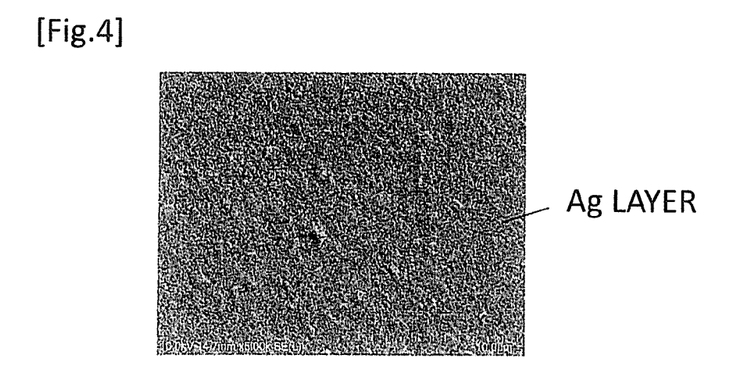
FIG. 4 is a scanning electronic microscope (SEM) micrograph of an Ag layer formed on a quartz substrate and having 0.75 at % of Nb dispersed therein, after heating at 700° C. for 1 hour.
Figure 5:
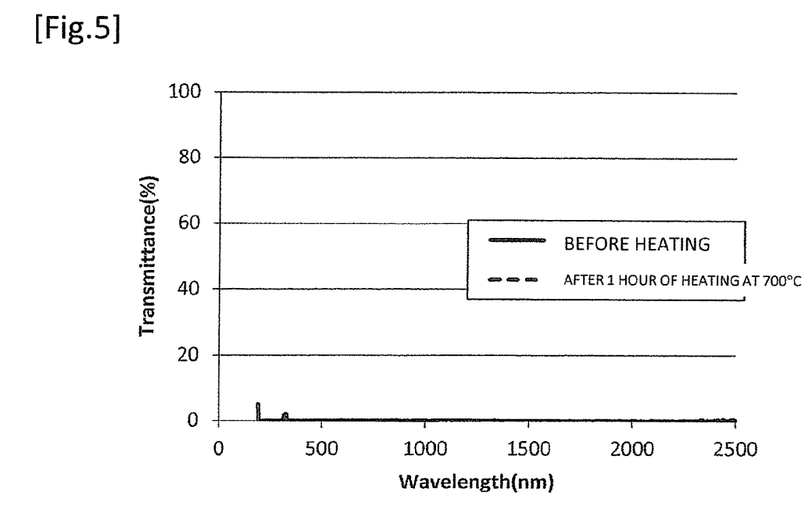
FIG. 5 illustrates results of light transmittance of an Ag layer formed on a quartz substrate and having 0.75 at % of Nb dispersed therein, before and after heating the Ag layer at 700° C. for 1 hour.

FIG. 4 illustrates a scanning electronic microscope (SEM) micrograph of an Ag layer 7, formed on a quartz substrate and having had 0.75 at % of Nb 6 dispersed therein, after heating at 700° C. for 1 hour. FIG. 5 illustrates results of light transmittance of the Ag layer 7 before and after heating the Ag layer at 700° C. for 1 hour.

As FIG. 4 illustrates, the quartz substrate underlying the Ag layer 7 does not become exposed, and there is virtually no aggregation or sublimation of Ag, even after heating at 700° C. for 1 hour. Moreover the light transmittance of the Ag layer 7 exhibits virtually no change before or after heating, as illustrated in FIG. 5. Therefore, an Ag layer 7 having Nb 6 dispersed therein allows suppressing aggregation and sublimation of Ag, even when exposed to a high temperature of about 700° C. Accordingly, the function of the Ag layer 7 as an infrared reflective layer 3 (function of reflecting thermal radiation from the heat medium and the tube) is not impaired, and the efficiency of conversion of sunlight to heat does not drop.

The content of Nb 6 in the Ag layer 7 is 0.1 at % to 31.8 at %, preferably 0.2 at % to 30 at %, more preferably 0.3 at % to 25 at %, yet more preferably 0.4 at % to 20 at % and particularly preferably 0.5 at % to 15 at %, from the viewpoint of suppressing aggregation and sublimation of Ag.

The thickness of the Ag layer 7 having Nb 6 dispersed therein is not particularly limited, but is preferably 10 nm to 500 nm, more preferably 30 nm to 400 nm, and yet more preferably 50 nm to 300 nm.

The Ag layer 7 having Nb 6 dispersed therein can be formed through sputtering in the presence of an inert gas such as nitrogen gas, argon gas or the like, using Ag and Nb as a target. The sputtering conditions are not particularly limited, and may be adjusted as appropriate depending on the apparatus that is utilized. As the target, individual targets of Ag and Nb or one target in the form of a mixture of Ag and Nb can be used.

The sunlight-heat conversion layer 4 formed on the infrared reflective layer 3 has the function of efficiently absorbing sunlight while suppressing heat dissipation by thermal radiation. The sunlight-heat conversion layer 4 is also referred to as a light-selective absorption layer.

A sunlight-heat conversion layer known in the relevant technical field can be used, without particular limitations, as the sunlight-heat conversion layer 4. Examples of the sunlight-heat conversion layer 4 include, for instance, a black chromium plating layer, a black nickel plating layer, an electroless nickel blackened layer, a triiron tetraoxide (Iron Oxide black) layer, a cermet layer (layer made up of a composite material of a ceramic and a metal), an iron silicide layer, a manganese silicide layer, a chromium silicide layer, or a layer made up of a composite material of manganese silicide or chromium silicide and a transparent dielectric (for instance, $SiO_2$, $Al_2O_3$, AlN or the like). The foregoing layers may be single layers or a plurality of layers of two or more types.

The thickness of the sunlight-heat conversion layer 4 is not particularly limited, but is preferably 1 nm to 10 μm, and more preferably 5 nm to 100 nm.

The method for forming the sunlight-heat conversion layer 4 is not particularly limited, and a method known in the relevant technical field can be resorted to. For instance, the sunlight-heat conversion layer 4 can be formed by chemical vapor deposition, physical vapor deposition (sputtering, vacuum deposition, ion plating or the like), or by plating.

The anti-reflection layer 5 formed on the sunlight-heat conversion layer 4 has the function to inhibit sunlight reflection.

An anti-reflection layer known in the relevant technical field can be used, without particular limitations, as the anti-reflection layer 5. Examples of the anti-reflection layer 5 include, for instance, transparent dielectric layers such as such as $SiO_2$ layers, $Al_2O_3$ layers, AlN layers, $Cr_2O_3$ layers and the like.

The thickness of the anti-reflection layer 5 is not particularly limited, but is preferably 10 nm to 500 nm.

The method for forming the anti-reflection layer 5 is not particularly limited, and a method known in the relevant technical field can be resorted to. For instance, the anti-reflection layer 5 can be formed by chemical vapor deposition or physical vapor deposition (sputtering, vacuum deposition or ion plating).

Through dispersion of Nb 6 in the Ag layer 7 at a predetermined proportion, the solar heat collector tube 1 of the present embodiment having such features is thereby provided with an infrared reflective layer 3 that suppresses aggregation and sublimation of Ag, and accordingly drops in the efficiency of conversion of sunlight to heat become less likely.

Embodiment 2

Figure 6:
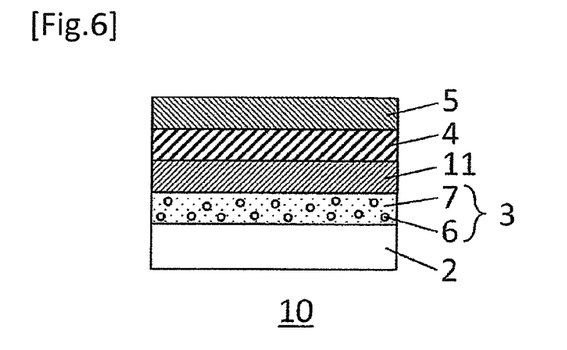
FIG. 6 is a partial cross-sectional diagram of a solar heat collector tube of Embodiment 2.

FIG. 6 is a partial cross-sectional diagram of a solar heat collector tube of the present embodiment.

In FIG. 6, a solar heat collector tube 10 of the present embodiment differs from the solar heat collector tube 1 of Embodiment 1 in that a metal protective layer 11 is provided between the infrared reflective layer 3 and the sunlight-heat conversion layer 4. Other features are identical to those of the solar heat collector tube 1 of Embodiment 1, and accordingly will not be explained.

The metal protective layer 11 has the function of making Ag contained in the infrared reflective layer 3 less likely to sublimate. Accordingly, sublimation of Ag contained in the infrared reflective layer 3 can be further suppressed, and impairment of the function of the infrared reflective layer 3 made less likely, by formation of the metal protective layer 11 between the infrared reflective layer 3 and the sunlight-heat conversion layer 4.

The metal protective layer used in the metal protective layer 11 is not particularly limited so long as the layer has the function of making Ag less likely to sublimate, and generally the layer is a metal protective layer formed out of a material of a higher melting point than that of Ag (melting point 961.8° C.). Examples of materials having a melting point higher than that of Ag include, for instance, Nb (melting point 2469° C.), Mo (melting point 2623° C.), W (melting point 3422° C.), Cu (melting point 1085° C.), Ni (melting point 1455° C.), Fe (melting point 1538° C.), Cr (melting point 1907° C.), Ta (melting point 3020° C.) and the like.

Preferably, the material that forms the metal protective layer 11 has high reflectance towards light in the infrared region. For instance, Nb has a reflectance of 96.1%, Mo of 97.1%, W of 95.2%, Cu of 97.4%, Ni of 86.4%, Fe of 81.8%, Cr of 81.3%, and Ta of 97.3%, towards infrared light at a wavelength of 2500 nm; preferred herein are thus Ta, Nb, Mo, W and Cu having a reflectance towards light in the infrared region in excess of 90%.

The thickness of the metal protective layer 11 may be set as appropriate for instance depending on the type of material that is used and is not particularly limited, but is preferably smaller than the thickness of the infrared reflective layer 3, from the viewpoint of suppressing thermal radiation.

An appropriate thickness of the metal protective layer 11 formed on the infrared reflective layer 3 may be worked out by calculating emissivity on the basis of the results of a multilayer film approximation using the optical constants of the materials that are utilized in the infrared reflective layer 3 and the metal protective layer 11. In a case, for instance, where the metal protective layer 11 is formed using Mo on the infrared reflective layer 3 having a thickness of 100 nm and comprising 0.75 at % of Nb 6, emissivity at 650° C. can be made lower than that of a Cu layer by prescribing the thickness of the metal protective layer 11 (Mo layer) to lie in the range of 0.1 nm to 40.5 nm. In a case where the metal protective layer 11 is formed using W, emissivity at 650° C. can be made lower than that of a Cu layer by prescribing the thickness of the metal protective layer 11 (W layer) to lie in the range of 0.1 nm to 14.5 nm. In a case where the metal protective layer 11 is formed using Nb, emissivity at 650° C. can be made lower than that of a Cu layer by prescribing the thickness of the metal protective layer 11 (Nb layer) to lie in the range of 0.1 nm to 5.9 nm.

The method for forming the metal protective layer 11 is not particularly limited, and a method known in the relevant technical field can be resorted to. For instance, the metal protective layer 11 can be formed by chemical vapor deposition or physical vapor deposition (sputtering, vacuum deposition or ion plating).

A solar heat collector tube 10 of the present embodiment having such features allows yet further suppression of sublimation of Ag contained in the infrared reflective layer 3, and accordingly impairment of the function of the infrared reflective layer 3 becomes yet less likely. Therefore, drops in efficiency of conversion of sunlight to heat are yet less likely in the solar heat collector tube 10.

Embodiment 3

Figure 7:
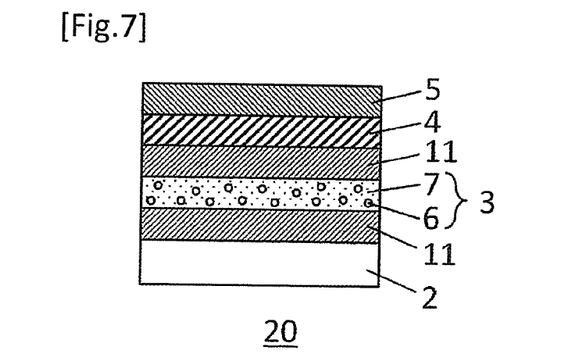
FIG. 7 is a partial cross-sectional diagram of a solar heat collector tube of Embodiment 3.

FIG. 7 is a partial cross-sectional diagram of a solar heat collector tube of the present embodiment.

In FIG. 7 a solar heat collector tube 20 of the present embodiment differs from the solar heat collector tube 10 of Embodiment 2 in that a metal protective layer 11 is further provided between the tube 2 and the infrared reflective layer 3. Other features are identical to those of the solar heat collector tube 10 of Embodiment 2, and accordingly will not be explained. The features of the present embodiment can apply also to the solar heat collector tube 1 of Embodiment 1.

The metal protective layer 11 provided between the tube 2 and the infrared reflective layer 3 is provided as the underlying base of the infrared reflective layer 3, and has the function of facilitating uniform formation of the infrared reflective layer 3. Accordingly, the infrared reflective layer 3 can be formed uniformly, and the function of the infrared reflective layer 3 can be obtained stably, by formation of the metal protective layer 11 between the tube 2 and the infrared reflective layer 3.

The metal protective layer 11 that is provided between the tube 2 and the infrared reflective layer 3 is not particularly limited, and there can be used the same metal protective layer 11 that is provided on the infrared reflective layer 3.

The thickness of the metal protective layer 11 provided between the tube 2 and the infrared reflective layer 3 is not particularly limited, so long as the function of the metal protective layer 11 as an underlying base can be brought out, but is generally 1 nm to 100 nm, preferably 3 nm to 50 nm, and more preferably 5 nm to 30 nm.

In addition to the effect of the solar heat collector tube 1 of Embodiment 1 or the solar heat collector tube 10 of Embodiment 2, the solar heat collector tube 20 of the present embodiment having such features allows the function of the infrared reflective layer 3 to stably achieved.

Embodiment 4

Figure 8:
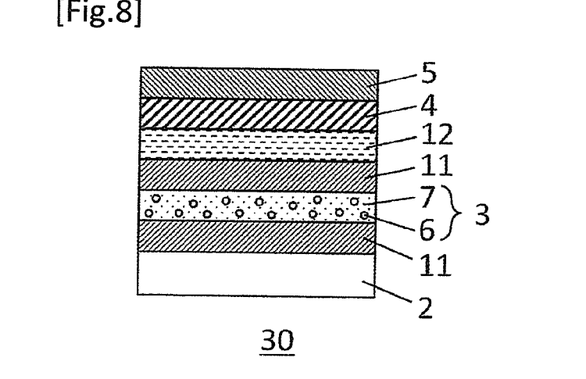
FIG. 8 is a partial cross-sectional diagram of a solar heat collector tube of Embodiment 4.

FIG. 8 is a partial cross-sectional diagram of a solar heat collector tube of the present embodiment.

In FIG. 8, a solar heat collector tube 30 of the present embodiment differs from the solar heat collector tube 20 of Embodiment 3 in that an oxygen barrier layer 12 is provided between the metal protective layer 11 and the sunlight-heat conversion layer 4. Other features are identical to those of the solar heat collector tube 20 of Embodiment 3, and accordingly will not be explained. The features of the present embodiment can apply also to the solar heat collector tube 10 of Embodiment 2.

The oxygen barrier layer 12 is provided for the purpose of preventing passage of oxygen, which gives rise to oxidation of the metal protective layer 11. Accordingly, oxidation of the metal protective layer 11 can be prevented by formation of the oxygen barrier layer 12 between the metal protective layer 11 and the sunlight-heat conversion layer 4, and accordingly impairment of the function of the metal protective layer 11 becomes less likely.

The oxygen barrier layer 12 is not particularly limited and any oxygen barrier layer can be employed so long as the passage of oxygen thereof is not easy, and, for instance, a dielectric layer can be used as the oxygen barrier layer 12. Examples of dielectric layers include, for instance, $SiO_2$ layers, $Al_2O_3$ layers, AlN layers, $Cr_2O_3$ layers and $Si_3N_4$ layers.

The thickness of the oxygen barrier layer 12 is not particularly limited, so long as passage of oxygen is precluded, but is generally 1 nm to 100 nm, preferably 3 nm to 50 nm, and more preferably 5 nm to 30 nm.

The method for forming the oxygen barrier layer 12 is not particularly limited, and a method known in the relevant technical field can be resorted to. For instance, the oxygen barrier layer 12 can be formed by chemical vapor deposition or physical vapor deposition (sputtering, vacuum deposition or ion plating).

Figure 9:
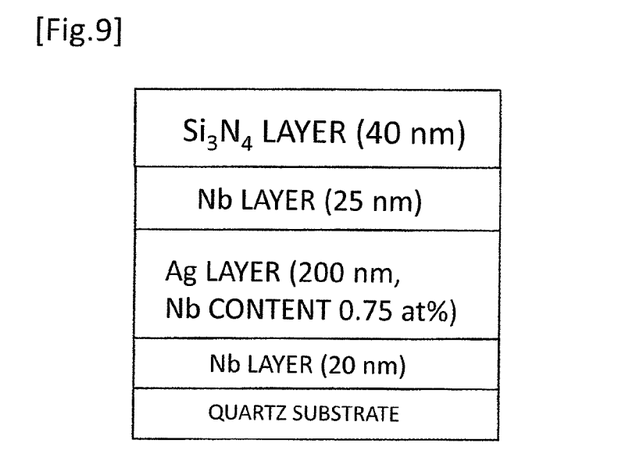
FIG. 9 is a stack resulting from sequential layering, on a quartz substrate, of a metal protective layer (20 nm Nb layer), an Ag layer (200 nm) having 0.75 at % of Nb dispersed therein, a metal protective layer (25 nm Nb layer) and an oxygen barrier layer (40 nm $Si_3N_4$ layer).
Figure 10:
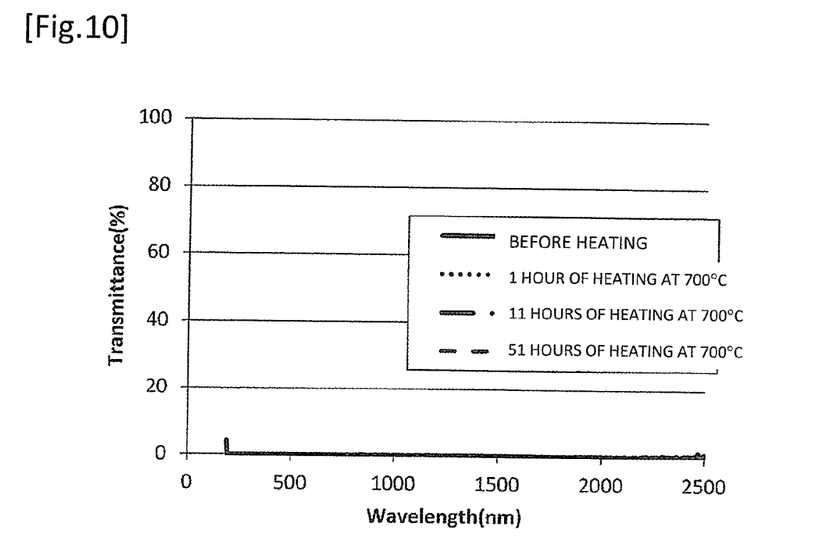
FIG. 10 illustrates results of light transmittance of the stack of FIG. 9 before and after heating of the stack at 700° C. for 1 hour, 11 hours and 51 hours.

Herein the stack of FIG. 9 is produced through sequential layering, on a quartz substrate, of the metal protective layer 11 (20 nm Nb layer), the Ag layer 7 (200 nm) having 0.75 at % of Nb 6 dispersed therein, the metal protective layer 11 (25 nm Nb layer) and the oxygen barrier layer 12 (40 nm $Si_3N_4$ layer). FIG. 10 illustrates the results of light transmittance of the stack before and after heating of the stack at 700° C. for 1 hour, 11 hours and 51 hours. As FIG. 10 reveals, the light transmittance of the stack exhibits virtually no change before or after heating. By adopting such a multilayer structure, therefore, the functions of the various layers are not impaired and the efficiency of conversion of sunlight to heat does not drop.

In addition to the effect of the solar heat collector tube 10 of Embodiment 2 and the effect of the solar heat collector tube 20 of Embodiment 3, the solar heat collector tube 30 of the present embodiment having such features allows prevention of impairment in the function of the metal protective layer 11 caused by oxidation thereof.

Embodiment 5

Figure 11:
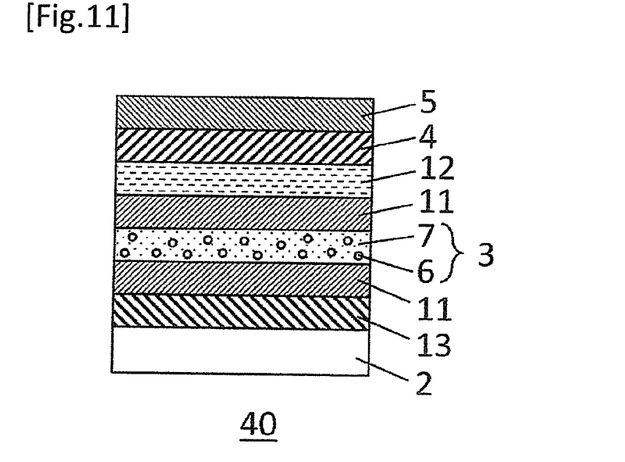
FIG. 11 is a partial cross-sectional diagram of a solar heat collector tube of Embodiment 5.

FIG. 11 is a partial cross-sectional diagram of a solar heat collector tube of the present embodiment.

In FIG. 11, a solar heat collector tube 40 of the present embodiment differs from the solar heat collector tube 30 of Embodiment 4 in that herein a diffusion preventing layer 13 is provided between the tube 2 and the infrared reflective layer 3. Other features are identical to those of the solar heat collector tube 30 of Embodiment 4, and accordingly will not be explained. The features of the present embodiment can also apply to the solar heat collector tube 1 of Embodiment 1, the solar heat collector tube 10 of Embodiment 2 and the solar heat collector tube 20 of Embodiment 3.

The diffusion preventing layer 13 is provided for the purpose of preventing components of the tube 2 (for instance, Cr) from diffusing into the layer (metal protective layer 11 in FIG. 11) overlying the tube 2. Impairment of the function of the layer (metal protective layer 11 in FIG. 11) overlying the tube 2 becomes less likely by formation of the diffusion preventing layer 13 on the outer surface of the tube 2.

A diffusion preventing layer known in the relevant technical field can be used, without particular limitations, as the diffusion preventing layer 13. Examples of materials used in the diffusion preventing layer 13 include, for instance, oxides such as $SiO_2$ and $Al_2O_3$, and nitrides such as $Si_3N_4$ and AlN.

The thickness of the diffusion preventing layer 13 is not particularly limited, so long as components in the tube 2 can be prevented from diffusing into the layer above, but is generally of 1 nm to 100 nm, preferably 3 nm to 50 nm, and more preferably 5 nm to 30 nm.

The method for forming the diffusion preventing layer 13 is not particularly limited, and a method known in the relevant technical field can be resorted to. For instance, the diffusion preventing layer 13 can be formed by chemical vapor deposition or physical vapor deposition (sputtering, vacuum deposition or ion plating).

In addition to the effects of the solar heat collector tube 1 of Embodiment 1, the solar heat collector tube 10 of Embodiment 2, the solar heat collector tube 20 of Embodiment 3 and the solar heat collector tube 30 of Embodiment 4, the solar heat collector tube 40 of the present embodiment having such features allows prevention of impairment in the function of the layer overlying the tube 2.

Embodiment 6

Figure 12:
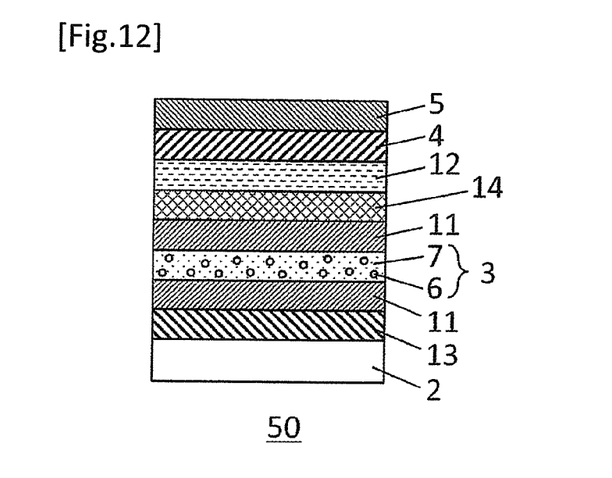
FIG. 12 is a partial cross-sectional diagram of a solar heat collector tube of Embodiment 6.

FIG. 12 is a partial cross-sectional diagram of a solar heat collector tube of the present embodiment.

In FIG. 12, a solar heat collector tube 50 of the present embodiment differs from the solar heat collector tube 40 of Embodiment 5 in that a reaction preventing layer 14 is provided between the metal protective layer 11 and the oxygen barrier layer 12. Other features are identical to those of the solar heat collector tube 40 of Embodiment 5, and accordingly will not be explained. The features of the present embodiment can also apply to the solar heat collector tube 30 of Embodiment 4.

The reaction preventing layer 14 is provided in order to prevent reactions between the metal protective layer 11 and the oxygen barrier layer 12. Impairment of the functions of the metal protective layer 11 and of the oxygen barrier layer 12 becomes accordingly less likely by providing the reaction preventing layer 14 between the metal protective layer 11 and the oxygen barrier layer 12.

Even if the oxygen barrier layer 12 is not formed, the reaction preventing layer 14 allows preventing reactions between the metal protective layer 11 and the sunlight-heat conversion layer 4. The reaction prevention of layer 14 also has the function of preventing passage of oxygen, and accordingly can substitute for the oxygen barrier layer 12 in this case.

The reaction preventing layer 14 is not particularly limited, so long as reactions between the metal protective layer 11 and the oxygen barrier layer 12 or the sunlight-heat conversion layer 4 are less likely, and a layer known in the relevant technical field can be used as the reaction preventing layer 14. Examples of materials utilized in the reaction preventing layer 14 include, for instance, silicides such as niobium silicide ($NbSi_2$) and tantalum silicide ($TaSi_2$). Among the foregoing, the material of the reaction preventing layer 14 is preferably a silicide of a metal that is used in the metal protective layer 11.

The thickness of the reaction preventing layer 14 is not particularly limited so long as reactions between the metal protective layer 11 and the oxygen barrier layer 12 or the sunlight-heat conversion layer 4 can be prevented, but is generally 1 nm to 200 nm, preferably 3 nm to 100 nm and more preferably 5 nm to 80 nm.

The method for forming the reaction preventing layer 14 is not particularly limited, and a method known in the relevant technical field can be resorted to. For instance, the reaction preventing layer 14 can be formed by chemical vapor deposition, physical vapor deposition (sputtering, vacuum deposition or ion plating).

In addition to the effect of the solar heat collector tube 30 of Embodiment 4 and the solar heat collector tube 40 of Embodiment 5, the solar heat collector tube 50 of the present embodiment having such features allows prevention of impairment of the function of the metal protective layer 11 and the oxygen barrier layer 12 or the sunlight-heat conversion layer 4.

Embodiment 7

Figure 13:
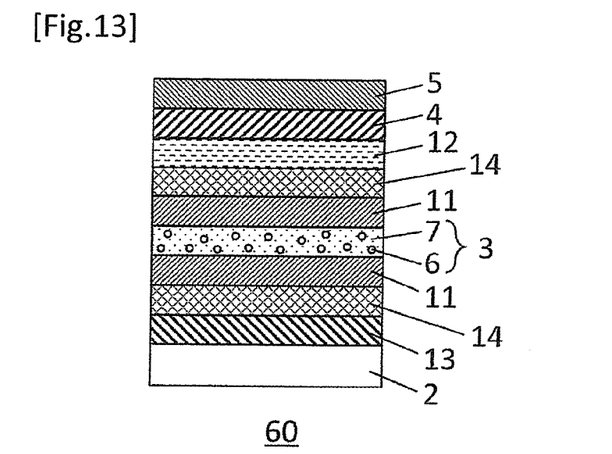
FIG. 13 is a partial cross-sectional diagram of a solar heat collector tube of Embodiment 7.

FIG. 13 is a partial cross-sectional diagram of a solar heat collector tube of the present embodiment.

In FIG. 13, a solar heat collector tube 60 of the present embodiment differs from the solar heat collector tube 50 of Embodiment 6 in that a reaction preventing layer 14 is provided between the diffusion preventing layer 13 and the metal protective layer 11. Other features are identical to those of the solar heat collector tube 50 of Embodiment 6, and accordingly will not be explained. The features of the present embodiment can apply also to the solar heat collector tube 40 of Embodiment 5.

The reaction preventing layer 14 that is provided between the diffusion preventing layer 13 and the metal protective layer 11 is provided in order to prevent reactions between the diffusion preventing layer 13 and the metal protective layer 11. Accordingly, impairment of the functions of the diffusion preventing layer 13 and the metal protective layer 11 becomes less likely by providing the reaction preventing layer 14 between the diffusion preventing layer 13 and the metal protective layer 11.

A reaction preventing layer identical to the reaction preventing layer 14 that is provided between the metal protective layer 11 and the oxygen barrier layer 12 can be used as the reaction preventing layer 14 that is provided between the diffusion preventing layer 13 and the metal protective layer 11. Among the foregoing, the material of the reaction preventing layer 14 is preferably a silicide of a metal that is used in the metal protective layer 11.

The thickness of the reaction preventing layer 14 that is provided between the diffusion preventing layer 13 and the metal protective layer 11 is not particularly limited, so long as reactions between the diffusion preventing layer 13 and the metal protective layer 11 can be prevented, but is generally 1 nm to 150 nm, preferably 5 nm to 100 nm and more preferably 10 nm to 80 nm.

Figure 14:
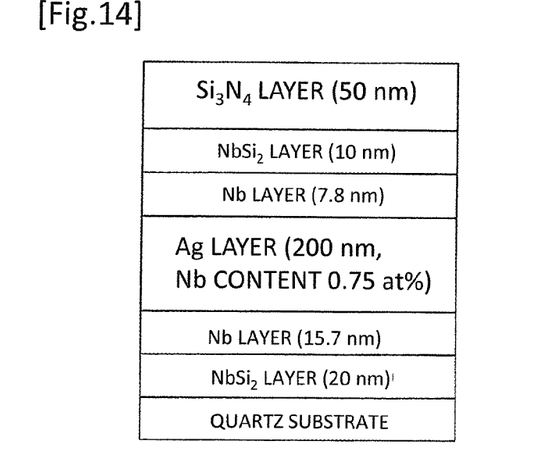
FIG. 14 is a stack resulting from sequential layering, on a quartz substrate, of a reaction preventing layer (20 nm $NbSi_2$ layer), a metal protective layer (15.7 nm Nb layer), an Ag layer (200 nm) having 0.75 at % Nb dispersed therein, a metal protective layer (7.8 nm Nb layer), a reaction preventing layer (10 nm $NbSi_2$ layer) and an oxygen barrier layer (50 nm $Si_3N_4$ layer).
Figure 15:
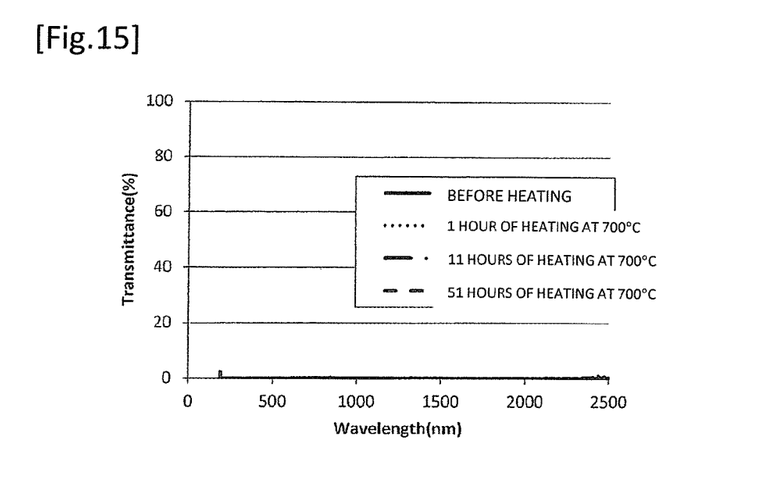
FIG. 15 illustrates results of light transmittance of the stack of FIG. 14 before and after heating of the stack at 700° C. for 1 hour, 11 hours and 51 hours.

Herein the stack of FIG. 14 is produced through sequential layering, on a quartz substrate, of the reaction preventing layer 14 (20 nm $NbSi_2$ layer), the metal protective layer 11 (15.7 nm Nb layer), the Ag layer 7 (200 nm) having 0.75 at % of Nb 6 dispersed therein, the metal protective layer 11 (7.8 nm Nb layer), the reaction preventing layer 14 (10 nm $NbSi_2$ layer) and the oxygen barrier layer 12 (50 nm $Si_3N_4$ layer). FIG. 15 illustrates the results of light transmittance of the stack before and after heating of the stack at 700° C. for 1 hour, 11 hours and 51 hours. As FIG. 15 reveals, the light transmittance of the stack exhibits virtually no change before or after heating. By adopting such a multilayer structure, therefore, the functions of the various layers are not impaired and the efficiency of conversion of sunlight to heat does not drop.

In addition to the effect of the solar heat collector tube 40 of Embodiment 5 and of the solar heat collector tube 50 of Embodiment 6, the solar heat collector tube 60 of the present embodiment having such features allows prevention of impairment of the functions of the metal protective layer 11 and the diffusion preventing layer 13.

The present international application claims priority based on Japanese Patent Application No. 2016-015492, filed on Jan. 29, 2016, the entire contents whereof being incorporated herein by reference.

REFERENCE SIGNS LIST 1, 10, 20, 30, 40 Solar heat collector tube
2 Tube
3 Infrared reflective layer
4 Sunlight-heat conversion layer
5 Anti-reflection layer
6 Nb
7 Ag layer
11 Metal protective layer
12 Oxygen barrier layer
13 Diffusion preventing layer
14 Reaction preventing layer

The invention claimed is:

1. A solar heat collector tube in which at least an infrared reflective layer, a sunlight-heat conversion layer and an anti-reflection layer are provided on an outer surface of a tube, through the interior of which a heat medium can flow, wherein the infrared reflective layer is an Ag layer having Nb dispersed therein, and content of Nb is 0.1 at % to 31.8 at %, wherein a metal protective layer is provided between the infrared reflective layer and the sunlight-heat conversion layer, and wherein the metal protective layer is formed by at least one metal selected from a group consisting of Nb, Mo, W, Cu, Ni, Fe, Cr and Ta, and wherein an oxygen barrier layer is provided directly between the metal protective layer and the sunlight-heat conversion layer.

2. The solar heat collector tube of claim 1, wherein the metal protective layer is provided between the outer surface of the tube and the infrared reflective layer.

3. The solar heat collector tube of claim 1 wherein a diffusion preventing layer is further provided between the outer surface of the tube and the infrared reflective layer.

4. The solar heat collector tube of claim 1, wherein a reaction preventing layer is provided between the metal protective layer and the sunlight-heat conversion layer.

5. The solar heat collector tube of claim 3, wherein a reaction preventing layer is provided between the diffusion preventing layer and the metal protective layer.

* * * * *